(12) United States Patent
Genet et al.

(10) Patent No.: US 7,263,741 B2
(45) Date of Patent: Sep. 4, 2007

(54) WINDSCREEN WIPER DEVICE

(75) Inventors: Sophie Genet, Chenieres (FR); Pierre Henin, Bellefontaine (BE); Fernaud Thibaut, Eischen (LU)

(73) Assignee: Federal Mogual S.A., Aubange (BE)

( * ) Notice: Subject to any disclaimer, the term of this patent is extended or adjusted under 35 U.S.C. 154(b) by 399 days.

(21) Appl. No.: 10/476,774

(22) PCT Filed: May 3, 2002

(86) PCT No.: PCT/EP02/04941

§ 371 (c)(1),
(2), (4) Date: Jun. 4, 2004

(87) PCT Pub. No.: WO02/090156

PCT Pub. Date: Nov. 14, 2002

(65) Prior Publication Data

US 2004/0216260 A1   Nov. 4, 2004

(30) Foreign Application Priority Data

May 8, 2001   (EP) ................................. 01201674

(51) Int. Cl.
*B60S 1/40* (2006.01)
(52) U.S. Cl. ............................... 15/250.32; 15/250.43; 15/250.201
(58) Field of Classification Search ............. 15/250.32, 15/250.43, 250.44, 250.451, 250.453, 250.454, 15/250.351
See application file for complete search history.

(56) References Cited

U.S. PATENT DOCUMENTS

| | | | |
|---|---|---|---|
| 2,404,523 A | 7/1946 | Nesson | |
| 2,782,442 A * | 2/1957 | Krohm | 15/250.452 |
| 3,576,044 A * | 4/1971 | Besnard | 15/250.32 |
| 3,659,309 A | 5/1972 | Besnard | |
| 3,942,212 A * | 3/1976 | Steger et al. | 15/250.201 |
| 5,970,569 A * | 10/1999 | Merkel et al. | 15/250.43 |
| 6,295,690 B1 * | 10/2001 | Merkel et al. | 15/250.201 |

FOREIGN PATENT DOCUMENTS

| | | |
|---|---|---|
| DE | 198 60 644 A1 | 7/2000 |
| DE | 199 45 858 A1 | 3/2001 |
| DE | 199 52 054 A1 | 5/2001 |
| EP | 0279640 * | 8/1988 |

* cited by examiner

*Primary Examiner*—Gary K. Graham
(74) *Attorney, Agent, or Firm*—Robert L. Stearns; Dickinson Wright PLLC

(57) ABSTRACT

A windscreen wiper device comprising an elastic, elongated carrier element, as well as an elongated wiper blade of a flexible material, which can be place in abutment with a windscreen to be wiped, which wiper blade includes opposing longitudinal grooves on its longitudinal sides, in which grooves space-apart longitudinal strips of the carrier element are disposed, wherein neighboring ends of said longitudinal strips are interconnected by a respective connecting piece, which windscreen wiper device comprises a connecting device for an oscillating wiper arm, whrein said oscillating arm is pivotally connected to said connecting device about a pivot axis near one end, a special feature of which is that the end of the oscillating wiper arm includes two at lest substantially cylindrical protrusions, which form bearing surfaces, at the location of the pivot axis, which protrusions extend in lateral direction with respect to the oscillating wiper arm.

15 Claims, 2 Drawing Sheets

# WINDSCREEN WIPER DEVICE

BACKGROUND OF THE INVENTION

1. Technical Field

The invention relates to a windscreen wiper device comprising an elastic, elongated carrier element, as well as an elongated wiper blade of a flexible material, which can be placed in abutment with a windscreen to be wiped, which wiper blade includes opposing longitudinal grooves on its longitudinal sides, in which grooves spaced-apart longitudinal strips of the carrier element are disposed, wherein neighbouring ends of said longitudinal strips are interconnected by a respective connecting piece, which windscreen wiper device comprises a connecting device for an oscillating wiper arm, wherein said oscillating arm is pivotally connected to said connecting device about a pivot axis near one end.

2. Related Art

Such a windscreen wiper device is generally known. The prior art windscreen wiper device is in particular designed as a "yokeless" wiper device, wherein use is no longer made of several yokes pivotally connected to each other, but wherein the wiper blade is biassed by the carrier element, as a result of which it exhibits a specific curvature. The oscillating arm of the prior art windscreen wiper device comprises a projecting pin on one side thereof, which is inserted sideways into a through hole of the connecting device.

One drawback of the prior art windscreen wiper device is the fact that in practice the forces (torques) that are exerted on the connection between the connecting device and the oscillating arm appear to be relatively high, as a result of which the reliability of said connection appears to diminish with the passage of time. In addition, said forces (torques) will be extra high if (as is the case with the prior art windscreen wiper device) the pin of the oscillating arm, which projects in one direction, is inserted into the through hole of the connecting device at a high point relative to the wiper blade.

SUMMARY OF THE INVENTION

The object of the invention is to overcome the drawbacks of the prior art as indicated above, in particular to provide a windscreen wiper device wherein the oscillating wiper and the connecting device are interconnected in a durable, solid manner.

In order to accomplish that objective, a windscreen wiper device of the kind referred to in the introduction is characterized in that the end of the oscillating wiper arm includes two at least substantially cylindrical protrusions, which form bearing surfaces, at the location of the pivot axis, which protrusions extend in lateral direction with respect to the oscillating wiper arm. As a result, the two protrusions that function as bearing surfaces are spaced far apart, so that the forces that are exerted on said bearing surfaces will be relatively low. In particular, the protrusions can be pivotally fitted in correspondingly shaped recesses in the connecting device.

In one preferred embodiment of a windscreen wiper device according to the invention, the protrusions can be snapped into said recesses.

In another preferred embodiment of a windscreen wiper device according to the invention, the protrusions are dimensioned such that they can be passed through insertion openings of the recesses from an at least substantially perpendicular position of the oscillating arm with respect to the wiper blade, and be locked in position in said recesses from an at least substantially parallel position of the oscillating wiper arm with respect to the wiper blade. This makes it possible to move, in particular pivot, the oscillating wiper arm from a mounting position (that is, a (vertical) position perpendicularly to the wiper blade or the plane of a windscreen to be wiped) to an operative position (that is, a (horizontal) position parallel to the wiper blade or the plane of a windscreen to be wiped). In the mounting position, the protrusions can be freely inserted into the insertion openings of the recesses and subsequently be mounted in said recesses, whilst in the operative position the protrusions are locked in position in said recesses, so that they cannot move out of said recesses via the insertion openings.

In another preferred embodiment of a windscreen wiper device according to the invention, the connecting device includes a guide groove for the oscillating wiper arm. Since the oscillating wiper arm is at least partially disposed in said guide groove in the aforesaid operative position, the oscillating wiper arm comprises additional capability of withstanding relatively high torques in that position.

In another preferred embodiment of a windscreen wiper device according to the invention, said connecting pieces are clamping members, which form separate constructional elements. In particular, said connecting pieces are form-locked ("positive locking" or "having positive fit") or force-locked to the adjacent ends of the longitudinal strips.

In another preferred embodiment of a windscreen wiper device according to the invention, said connecting pieces are in one piece with said longitudinal strips.

In another preferred embodiment of a windscreen wiper device according to the invention, at least said longitudinal strips are made of spring band material, preferably steel.

In another preferred embodiment of a windscreen wiper device according to the invention, said connecting device comprises clamping members, which engage round longitudinal sides of said longitudinal strips that face away from each other. In particular, said connecting device and said clamping members are made in one piece.

The invention furthermore relates to a method for manufacturing a windscreen wiper device according to the invention, wherein opposing longitudinal grooves are formed in the longitudinal sides of an elongated wiper blade of a flexible material, which can be placed in abutment with a windscreen to be wiped, in which grooves longitudinal strips of a carrier element are subsequently fitted in spaced-apart relationship, wherein neighbouring ends of said longitudinal strips are interconnected by a respective connecting piece, wherein an oscillating arm is pivotally connected to a connecting device of the windscreen wiper device about a pivot axis near one end thereof, characterized in that the end of the oscillating wiper arm is fitted with two at least substantially cylindrical protrusions, which form bearing surfaces, at the location of the pivot axis, which protrusions extend in lateral direction with respect to the oscillating wiper arm.

BRIEF DESCRIPTION OF THE DRAWINGS

The invention will now be explained in more detail with reference to figures illustrated in a drawing, wherein.

DETAILED DESCRIPTION OF THE INVENTION

Figure 1:
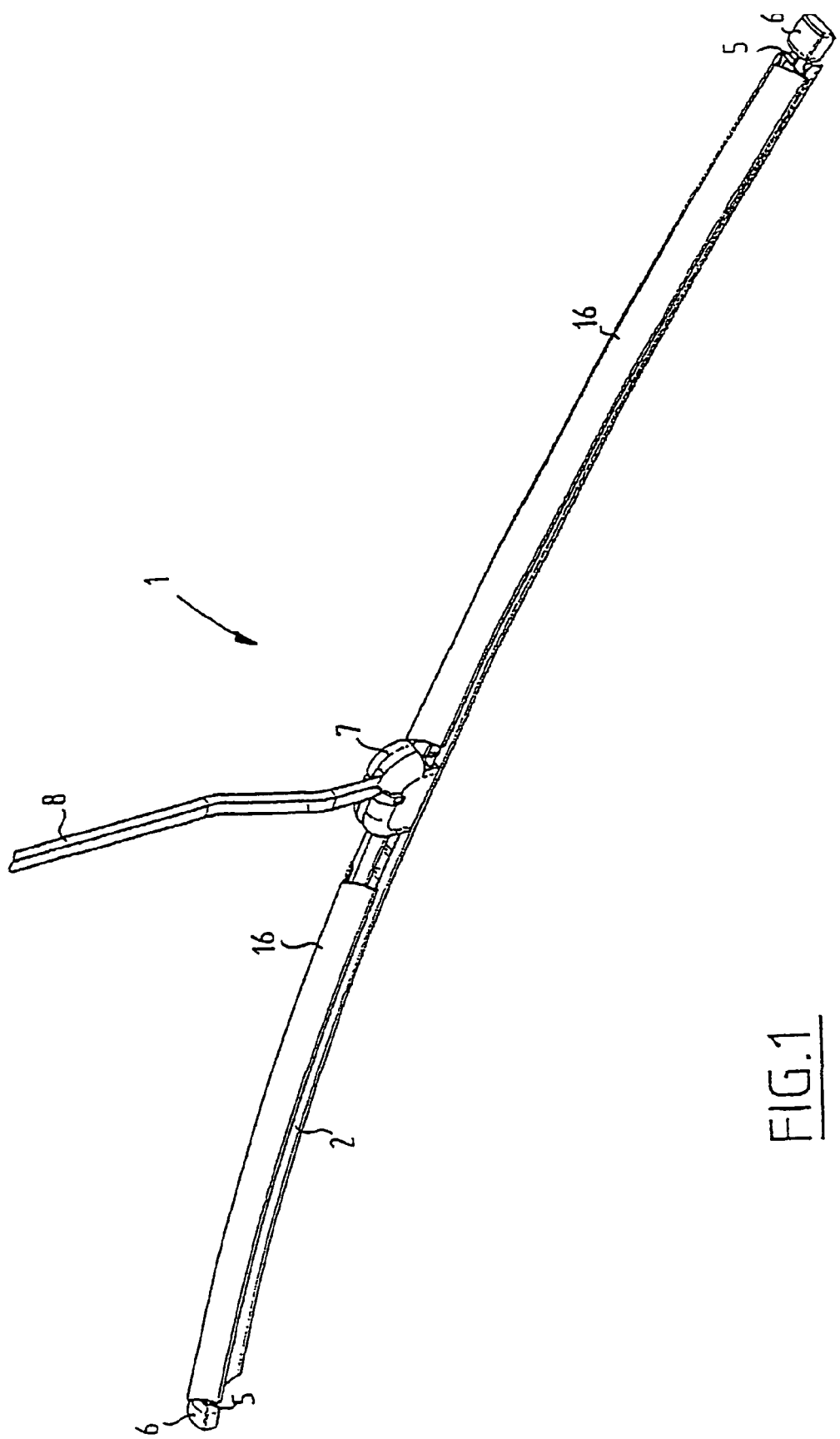
FIG. 1 is a perspective, schematic view of a preferred embodiment of a windscreen wiper device according to the invention.
Figure 2:
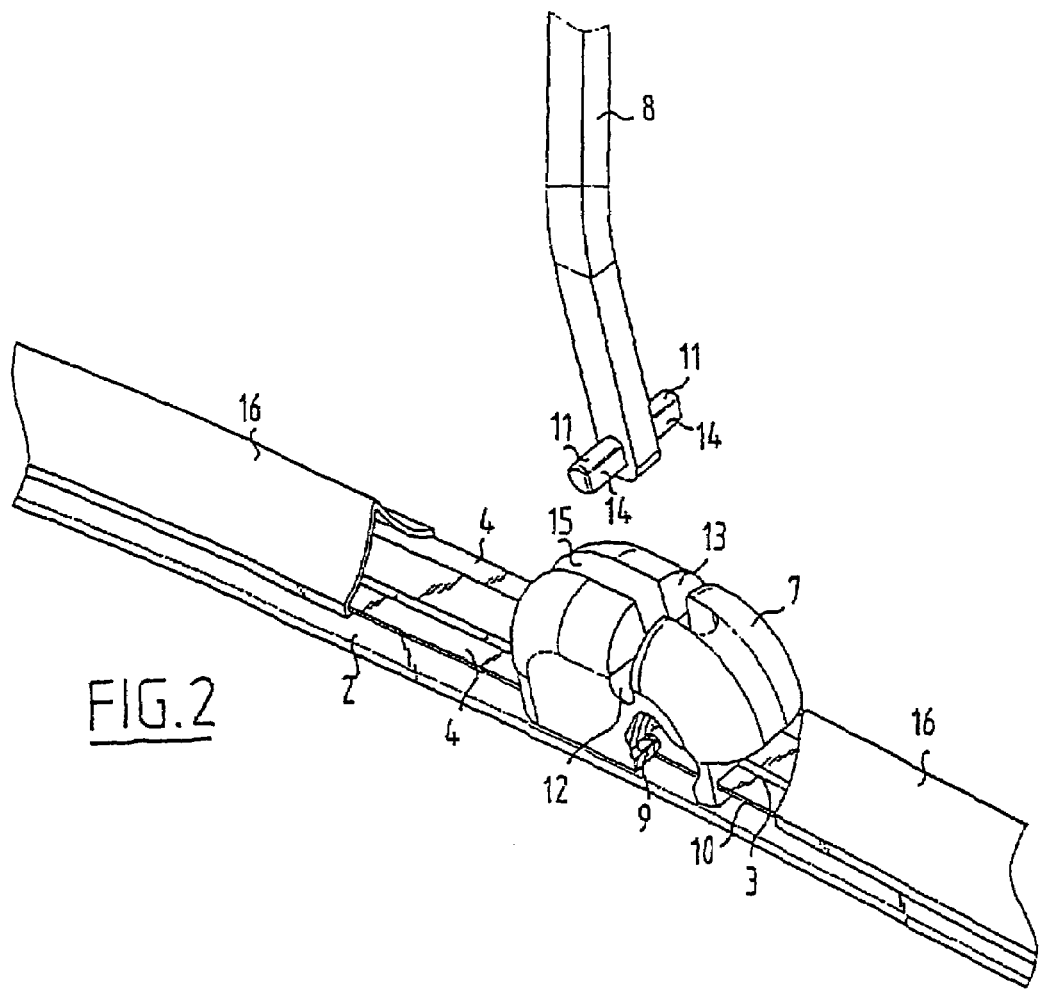
FIGS. 2 and 3 show details of the windscreen wiper device of FIG. 1, wherein various successive steps for fitting an oscillating wiper arm to a connecting device of the windscreen wiper device of FIG. 1.
Figure 3:
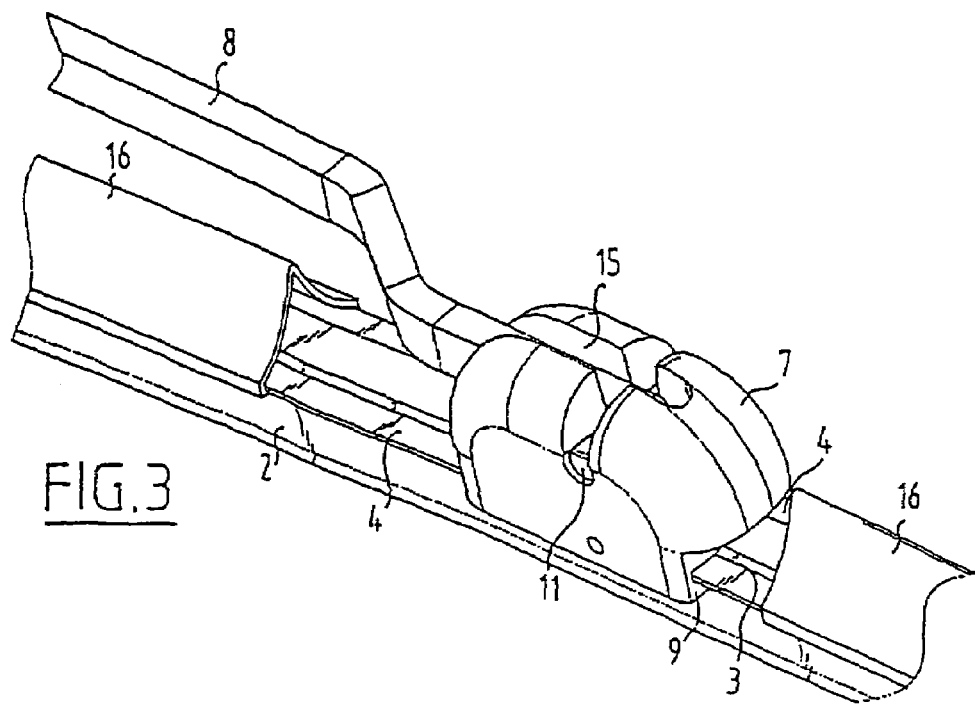

FIGS. 1, 2 and 3 show a preferred variant of a windscreen wiper device 1 according to the invention. Said windscreen wiper device is built up of an elastomeric wiper blade 2, in the longitudinal sides of which opposing longitudinal grooves 3 are formed, and of longitudinal strips 4 made of spring band steel, which are fitted in said longitudinal grooves 3. Said strips 4 form a flexible carrier element for the rubber wiper blade 2, as it were, which is thus biassed in a curved position (the curvature in operative position being that of a windscreen to be wiped). Neighbouring ends 5 of strips 4 are interconnected on either side of the windscreen wiper device 1 by means of connecting pieces 6 functioning as clamping members. In this embodiment, the connecting pieces 6 are separate constructional elements, which may be form-locked ("positive locking" or "having positive fit") as well as force-locked to the ends 5 of strips 4. In another preferred variant, said connecting pieces 6 are in one piece with the strips 4 made of spring band steel. In the latter case said connecting pieces form transverse bridges for the strips 4, as it were.

The windscreen wiper device 1 is furthermore built up of a connecting device 7 of plastic material for an oscillating wiper arm 8. Connecting device 7 comprises clamping members 9 that are integral therewith, which engage round longitudinal sides 10 of the strips 4 that face away from each other, as a result of which the connecting device 7 is firmly attached to the unit consisting of wiper blade 2 and strips 4. The oscillating wiper arm 8 is pivotally connected to the connecting device 7 about a pivot axis near one end, and that in the following manner. The end of oscillating wiper arm 8 includes two at least substantially cylindrical protrusions 11, which form bearing surfaces, at the location of the pivot axis. Said protrusions 11 can be readily inserted into correspondingly shaped recesses 12 in the connecting device 7 from a vertical position of the oscillating wiper arm 8. This can take place freely from said vertical position, because the width of said protrusions 11 is smaller than that of the insertion openings 13 of the recesses 12 in that position: it so happens that both protrusions 11 have a flat guide surface 14 (FIG. 2). Then the oscillating wiper arm 8 is pivoted through 90 degrees about the pivot axis, from its vertical position to a horizontal position (FIG. 3). In the horizontal position of the oscillating wiper arm 8, the width of said protrusions 11 is smaller than the width of the insertion openings 13 of recesses 12, so that the oscillating wiper arm 8 is locked with respect to the connecting device 7 in that position (FIG. 3). FIGS. 2 and 3 clearly show that the connecting device 7 includes a longitudinal guide groove or guide slot 15, in which the end of the oscillating wiper arm 8 rests in its horizontal position. In another preferred variant, the protrusions 11 can be snapped, that is, clipped into said recesses. Possibly, a spoiler 16 is furthermore provided.

In order to prevent the occurrence of wear on protrusions 11, said protrusions are preferably each fitted with a joint part or spacer of a wear-resistant plastic material, which surrounds said protrusions, so that the pivoting movement of connecting device 7 and oscillating wiper arm 8 with respect to each other takes place substantially without friction. Such a joint part is not necessarily mounted entirely around said protrusions: only these parts of said protrusions that during use make mechanical contact with (parts of) the connecting device 7 are surrounded by a joint part. When using joint parts said protrusions 11 may have an entirely round form (i.e. without a guide surface), seen in cross-section. Preferably, the end of the oscillating arm 8 that rests in the guide groove 15 is also surrounded by a joint part or spacer of a wear-resistant plactic material.

The invention is not restricted to the variants as shown in the drawing; but it also extends to other embodiments that fall within the scope of the appended claims.

The invention claimed is:

1. A windscreen wiper device comprising an elastic, elongated carrier element comprising a pair of resilient longitudinal strips biased in a normally curved condition and each having distal ends, as well as an elongated wiper blade of a flexible material, which can be placed in abutment with a windscreen to be wiped, which wiper blade includes opposing longitudinal grooves on its longitudinal sides, in which grooves the longitudinal strips of the carrier element are disposed in a spaced-apart parallel condition, wherein the neighboring ends of said longitudinal strips are interconnected by a respective connecting piece so as to fix the longitudinal strips together as a unit, which windscreen wiper device comprises a central connecting device for an oscillating wiper arm directly affixed to each of the longitudinal strips generally mid-way between their neighboring ends, wherein said oscillating arm is pivotally connected to said central connecting device about a pivot axis near one end of the oscillating arm, characterized in that the end of the oscillating wiper arm includes two at least substantially cylindrical protrusions, which form bearing surfaces, centered at the pivot axis, which protrusions extend in lateral direction with respect to the oscillating wiper arm and are spaced directly over each of the longitudinal strips, so that forces exerted on said bearing surfaces will be widely distributed through the central connecting device and into the longitudinal strips of the carrier element.

2. The windscreen wiper device according to claim 1, wherein said protrusions can be pivotally mounted in correspondingly shaped recesses in the central connecting device.

3. The windscreen wiper device according to claim 2, wherein said protrusions are dimensioned such that they can be passed through insertion openings of the recesses from an at least substantially perpendicular position of the oscillating arm with respect to the wiper blade, and be locked in position in said recesses from an at least substantially parallel position of the oscillating wiper arm with respect to the wiper blade.

4. The windscreen wiper device according to claim 3, wherein said central connecting device includes a guide groove for the oscillating wiper arm.

5. The windscreen wiper device according to claim 1, wherein said central connecting device includes a guide groove for the oscillating wiper arm.

6. The windscreen wiper device according to claim 5, wherein said connecting pieces are clamping members, which form separate constructional elements.

7. The windscreen wiper device according to claim 5, wherein said connecting pieces are in one piece with said longitudinal strips.

8. The windscreen wiper device according to claim 1, wherein said connecting pieces are clamping members, which form separate constructional elements.

9. The windscreen wiper device according to claim 8, wherein said connecting pieces are form-locked or force-locked to the adjacent ends of said longitudinal strips.

10. The windscreen wiper device according to claim 1, wherein said connecting pieces are in one piece with said longitudinal strips.

11. The windscreen wiper device according to claim 10, wherein at least said longitudinal strips are made of spring band material.

12. The windscreen wiper device according to claim 1, wherein at least said longitudinal strips are made of spring band material.

13. The windscreen wiper device according to claim 12, wherein said connecting device comprises clamping members, which engage round longitudinal sides of said longitudinal strips that face away from each other.

14. The windscreen wiper device according to claim 1, wherein said connecting device comprises clamping members, which engage round longitudinal sides of said longitudinal strips that face away from each other.

15. The windscreen wiper device according to claim 14, wherein said connecting device and said clamping members are made in one piece.

* * * * *